United States Patent [19]

Nishida

[11] Patent Number: 5,325,389
[45] Date of Patent: Jun. 28, 1994

[54] ION-LASER INCLUDING A SILICON CARBIDE DISCHARGE TUBE HAVING A SMALL ARITHMETIC ROUGHNESS

[75] Inventor: Kazuhisa Nishida, Tokyo, Japan

[73] Assignee: NEC Corporation, Tokyo, Japan

[21] Appl. No.: 981,941

[22] Filed: Nov. 23, 1992

[30] Foreign Application Priority Data

Nov. 22, 1991 [JP] Japan ................... 3-333958

[51] Int. Cl.⁵ .................................................. H01S 3/03
[52] U.S. Cl. ........................................ 372/61; 372/55; 372/62
[58] Field of Search ............... 372/61, 62, 59, 63, 372/109, 85, 64, 87, 69, 38, 92, 98

[56] References Cited

U.S. PATENT DOCUMENTS

| | | | |
|---|---|---|---|
| 3,688,217 | 8/1972 | Witte et al. | 372/61 X |
| 4,425,651 | 1/1984 | Popp et al. | 372/61 |
| 4,649,547 | 3/1987 | Carlson et al. | 372/61 |
| 4,685,109 | 8/1987 | Carlson et al. | 372/61 |
| 4,827,484 | 5/1989 | Cook, Jr. | 372/61 |
| 4,873,693 | 10/1989 | Cook, Jr. | 372/61 X |
| 4,912,719 | 3/1990 | Kanamoto et al. | 372/61 |
| 5,235,608 | 8/1993 | Konishi | 372/61 X |
| 5,258,992 | 11/1993 | Thyzel | 372/61 |
| 5,258,993 | 11/1993 | Gloser et al. | 372/65 |

FOREIGN PATENT DOCUMENTS 63-184378 7/1988 Japan .................. 372/61 X

*Primary Examiner*—Brian Healy
*Attorney, Agent, or Firm*—Young & Thompson

[57] ABSTRACT

The present invention provides a novel ion-laser tube possessive of a high output characteristic. The ion-laser tube includes an improved slender discharge tube made of silicon carbide possessive of a high resistivity to sputtering caused by high energy ions and electrons involved in a large discharge current. The improvement in the novel ion-laser tube over the prior art manifests in the discharge tube having an inner wall surface possessive of a small roughness, typically approximately 4 micrometers or smaller. Such small roughness in the inner wall surface of the discharge tube is possessive of preventing silicon carbide molecules existing in the inner wall surface thereof to be sputtered by high energy ions and electrons involved in the large discharge current. As a result of those, the novel ion-laser tube is free from a substantial reduction of laser output. The ion-laser tube also includes a tubular enclosure member for enclosing the discharge tube, which is made of aluminum nitride possessive of a high heat conductivity.

4 Claims, 3 Drawing Sheets

ION-LASER INCLUDING A SILICON CARBIDE DISCHARGE TUBE HAVING A SMALL ARITHMETIC ROUGHNESS

BACKGROUND OF THE INVENTION

The invention relates to an ion-laser tube, and more particularly to an ion-laser tube which provides a high output with a discharge of a relatively large current.

In general, the structure of such high output ion-laser tube includes a slender discharge tube made of a ceramic material such as silicon carbide. For such ion-laser tube, the possibility of the accomplishment of a high output with a large discharge current is likely to depend upon the quality of the discharge tube.

The ion-laser tube which employs an ionized gas such as argon and krypton ionized gases is well known in the art. Such ion-laser tube utilizes a laser oscillation caused by transitions of electrons between different energy levels possessed by such atoms of the ionized gas. In order to secure a high output, such ion-laser tube requires a discharge of a large current, typically 30 A or larger, for which a high ion-concentration of the ionized gas is required.

Such gas laser tube is likely to be possessive of a lower efficiency of a laser oscillation. Then, a greater part of a supplied electrical energy by a large discharge current is likely to be converted into a thermal energy and thus be consumed as a thermal energy, although this is undesirable. As a result of those, the slender discharge tube and its vicinity portions are forced to have a heat of a high temperature. Such accumulated heat in the laser tube causes a deformation of the laser tube and a depression of the ability of optical functions and characteristics possessed by the laser tube. Thus, such discharge tube requires a high quality material which is resistive to such high temperature. It is further desirable that the discharge tube and its enclosure members, in which the discharge tube is enclosed, are made of a material having a high heat conductivity so as to eliminate a great deal of the accumulated and unnecessary heat from the laser tube. It is furthermore desirable that the laser tube is possessive of a cooling feature for making an elimination of the undesirable heat. It is yet a further requirement that the slender discharge tube involved in the ion-laser tube is made of a material which is resistive to a high ion-concentration.

In addition, since the discharge tube has an inner wall which is exposed to a high energy plasma gas, or a high energy ionized gas, the inner wall of the discharge tube is subjected to sputtering accomplished by high energy ions and electrons of the plasma gas. Such sputtering causes the quality, or the characteristic of the discharge of the ion-laser tube to substantially be depressed. Then, the discharge tube is required to be made of a resistive material to such sputtering.

In recent years, for complying with the above requirements, it has been considerable to employ silicon carbide (SiC) and aluminium nitride (AlN) as materials of tubular members, for example, the slender discharge tubes and the enclosure members, both of which are involved in the ion-laser tube. The conventional structure of the ion-laser tube will now be described with reference to FIG. 1. The conventional structure of the ion-laser tube includes a slender discharge tube 21 which serves as a discharge tube. The slender discharge tube 21 is made of silicon carbide which is a resistive material to the sputtering caused by a high energy plasma gas. The silicon carbide slender discharge tube 21 is located along a center axis of the ion-laser tube. The silicon carbide slender discharge tube 21 also includes one end with a flange. The silicon carbide slender discharge tube 21 also defines a through hole 2 which serves as a discharge guiding way in which the discharge is occurred.

The silicon carbide slender discharge tube 21 is enclosed by a tubular enclosure member 3 being made of aluminium nitride which has a high heat conductivity. The aluminium nitride tubular enclosure member 3 includes a plurality of gas return holes 4, through which the ion-gas which has been served for discharge is transmitted. The aluminium nitride tubular enclosure member 3 has an inside diameter which corresponds approximately to an outside diameter of the silicon carbide slender discharge tube 21 so that the silicon carbide slender discharge tube 21 is inserted into the aluminium nitride tubular enclosure member 3. The silicon carbide slender discharge tube 21 is connected to the aluminium nitride tubular enclosure member 3 through a frit glass 6 so as to support a high heat conductivity possessed by the aluminium nitride tubular enclosure member 3 thereby resulting in a formation of a combined coaxial tubular member 25 comprising the silicon carbide sledder discharge tube 21 and the aluminium nitride tubular enclosure member 3.

A plurality of such combined coaxial tubular members 25 are connected to one another along the center axis through a frit glass 7 so as to support a high heat conductivity possessed by the aluminium nitride tubular enclosure member 3. The alignment of the combined coaxial tubular members 25 is carried out by using a jig which is not illustrated. The number of the combined coaxial tubular members 25 is variable by matching various requirements. The alignment of the plural combined coaxial tubular members 25 is terminated in borosilicate glass tubes 8. Namely, the alignment of the combined coaxial tubular members 25 is connected at its opposite ends with two of the borosilicate glass tubes 8.

Further, the alignment of the combined coaxial tubular members 25 terminated in the borosilicate glass tubes 8 is sealed at its opposite ends with two metal sealing members 11 respectively. One of the metal sealing members 11 is provided with an anode 9 through an anode side terminal 14. The anode 9 is enclosed by the borosilicate glass tube 8. This metal sealing member 11 further includes an exhaust tube 13 which serves for exhausting an unnecessary discharge gas. The one of the metal sealing members 11 including the anode 9 is located at the side of the one end with the flange of the silicon carbide slender discharge tube 21. Another of the metal sealing members 11 is provided with a cathode 10 through a cathode side terminal 15. The cathode 10 is enclosed by the borosilicate glass tube 8.

Both metal sealing members 11 have slender tubular projective portions which are located along the center axis respectively. Further, the slender tubular projective portions of the metal sealing members 11 are respectively provided with glass members such as Brewster windows 12, each of which has a predetermined locative angle, typically Brewster's angle. After mounting the Brewster windows 12, the ion-laser tube is filled with a predetermined deal of a discharge gas such as the argon gas thereby completing the ion-laser tube.

Since a silicon carbide material is possessive of a high resistivity to sputtering caused by a high energy ion-gas, the employments of the silicon carbide material for the slender discharge tube 21 is likely to be permissive of suppressing but not sufficiently various undesirable affections occurred by sputtering caused by a high energy ion-gas. As an aluminium nitride material is possessive of a high heat conductivity which permits eliminating a great deal of undesirable heat, the employment of the aluminium nitride material for the tubular enclosure member 3 is likely to allow an elimination of an undesirable heat generated by a large current of the discharge. Further, the implementation of cooling by applying a cooling medium on a surface of the ion-laser tube is permissible for the elimination of the unnecessary heat from the laser tube to external portions.

The desirable characteristics possessed by the above materials, or silicon carbide and aluminium nitride are permissive but not sufficiently of rendering the discharge of a large current stable. The characteristics of the output possessed by the conventional ion-laser tube is insufficient to implement a high output generated by a large current flowing the discharge slender tube. The reasons of those are as follows. As described the above, the inner wall of the silicon carbide slender discharge tube 21 is directly exposed to a high energy ionized gas, or plasma gas of a high temperature. Such high energy ionized gas including high energy ions and electrons supplied by a large discharge current, typically 30 A is likely to make sputtering to silicon carbide molecules involved in a surface of the inner wall of the silicon carbide slender discharge tube 21. Silicon carbide molecules which has been subjected to such sputtering are forced to be driven out from the surface of the inner wall of the silicon carbide slender discharge tube 21. After that, the sputtered silicon carbide molecules are likely to be deposited on inner surfaces of the Brewster windows 12. This renders the high output characteristics of the ion-laser tube be substantially depressed.

As a result of an aging test of the ion-laser tube for a high output of 30 A, following matters are observed. The output of the ion-laser tube is slowly reduced due to sputtered silicon carbide molecules. Further, the output of the ion-laser tube sometimes drops out, and thus are rapidly reduced during the operation of the ion-laser tube. The reduction of the output of the ion-laser tube manifests especially in a high output laser tube, but insufficiently in a middle output laser or a low output laser. It is considerable to suppress the substantial reduction of the output of the laser tube due to sputtering to the inner wall of the silicon carbide slender discharge tube 21, which is provided by the large discharge current.

From the aging tests of the output characteristics, it is found that the reduction of the output of the ion-laser tube caused by sputtering provided by the large discharge current is associated with a degree of a roughness in the surface of the inner wall of the silicon carbide slender discharge tube 21. When the degree of the roughness of the inner wall of the silicon carbide slender discharge tube 21 is relatively large, the reduction of the output of the ion-laser tube is also large. In contrast to the above, when the degree of the roughness of the inner wall of the silicon carbide slender discharge tube 21 is relatively small, the reduction of the output of the ion-laser tube is also small. Therefore, in the ion-laser tube involving the silicon carbide slender discharge tube and the aluminium nitride tubular enclosure member, a further improvement of the resistivity to the sputtering to the inner wall of the silicon carbide slender discharge tube 21 requires an uniformity and thus a smaller degree of the roughness in the surface of the inner wall of the silicon carbide slender discharge tube 21. Such improvement of the resistivity of the discharge tube to the sputtering provides the high output ion-laser tube with desirable and excellent output characteristics without reduction or dropping down.

SUMMARY OF THE INVENTION

Accordingly, it is a primary object of the present invention to provide an improved ion-laser tube which is possessive of an excellent output characteristic.

It is a further object of the present invention to provide an improved ion-laser which includes a discharge tube which is possessive of a long life time.

It is still a further object of the present invention to provide an improved ion-laser tube which includes a discharge tube being capable of preventing a reduction of an output and a depression of an output characteristic.

It is yet a further object of the present invention to provide an improved ion-laser tube which includes a silicon carbide discharge tube being possessive of a resistivity to sputtering caused by high energy ions and electrons supplied by a large discharge current.

The above and other objects, features and advantages of the present invention will be apparent from following descriptions.

The present invention provides an novel ion-laser tube which is possessive of a high output characteristic provided by a large discharge current. The structure of the novel ion-laser tube is analogous to the prior art, except for an improved silicon carbide slender discharge tube. Then, the improvement over the prior art is in an uniformity and thus a small degree of the roughness in a surface of an inner wall of the silicon carbide slender discharge tube. The improved silicon carbide slender discharge tube includes an inner wall having a small degree of the roughness in its surface, although the prior art silicon carbide slender discharge tube includes the inner wall having a large degree of the roughness in its surface. The inner wall of the silicon carbide slender discharge tube has an uniformity in its surface. For example, an arithmetic roughness, or a maximum height in irregularity possessed by the surface of the inner wall of the silicon carbide slender discharge tube is approximately 4 micrometers or smaller. Such uniformity and thus a small degree of the arithmetic roughness in the surface of the inner wall of the silicon carbide slender discharge tube is permissive of preventing silicon carbide molecules existing in the surface of the inner wall thereof to be sputtered by high energy ions and electrons supplied by a large discharge current. This is permissive of preventing output characteristics of the ion-laser tube to be depressed due to such sputtering.

BRIEF DESCRIPTION OF THE DRAWINGS

Preferred embodiments of the present invention will hereinafter fully be described in detail with reference to the accompanying drawings.

PREFERRED EMBODIMENTS OF THE INVENTION

The present invention provides an novel ion-laser tube which is possessive of a high output characteristic provided by a large discharge current. The structure of the novel ion-laser tube is analogous to the prior art, except for an improved silicon carbide slender discharge tube 1. Then, the improvement over the prior art manifests in a uniformity and thus a small degree of the irregularity in a surface of an inner wall of the silicon carbide slender discharge tube 1, the inner wall of which is directly exposed to a high temperature discharge ion-gas. The improved silicon carbide slender discharge tube 1 includes an inner wall having a small degree of the roughness in its surface, although the prior art silicon carbide slender discharge tube 21 includes the inner wall having a large degree of the roughness in its surface. The inner wall of the silicon carbide slender discharge tube 1 has an uniformity in its surface. Such uniformity and thus a small degree of the irregularity in the surface of the inner wall of the silicon carbide slender discharge tube is permissive of preventing silicon carbide molecules existing within the surface of the inner wall thereof to be sputtered by high energy ions and electrons supplied by a large discharge current. This is permissive of preventing output characteristics of the ion-laser tube to be depressed due to such sputtering.

Figure 3:
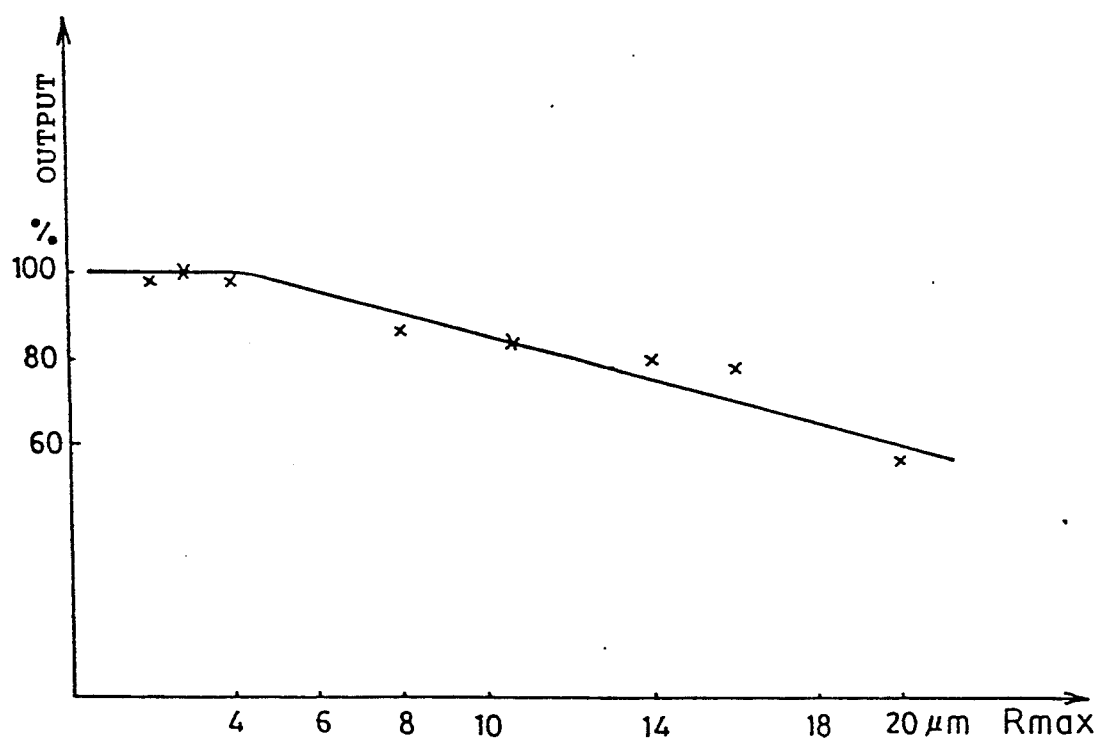
FIG. 3 is a diagram illustrative of a degree of a reduction of an output of the ion-laser tube after aging of 10 hours in contrast with an arithmetic roughness in a surface of an inner wall of the discharge tube.

FIG. 3 illustrates a degree of a reduction of an output of the ion-laser tube after aging of 10 hours in contrast with an arithmetic roughness, or a maximum height (Rmax) in a surface of an inner wall of the silicon carbide slender discharge tube 1. From FIG. 3, following matters are understood. When the arithmetic roughness in the surface of the inner wall is suppressed within 4 micrometers, approximately zero reduction of the output of the laser tube is occurred. Then, a slender discharge tube having an arithmetic roughness suppressed within approximately 4 micrometers is permissive of having a predetermined initial output value remain through the 10 hour aging.

In contrast to the above, when the arithmetic roughness in the surface of the inner wall of the silicon carbide slender discharge tube 1 is larger than approximately 4 micrometers, a substantial reduction of the output of the ion-laser tube is appeared As the arithmetic roughness in the inner wall surface of the silicon carbide discharge tube 1 is enlarged, the degree of the output reduction of the ion-laser tube is also increased but slowly. Then, the enlargement of the arithmetic roughness in the inner wall surface of the silicon carbide discharge tube 1 renders a degree of the output reduction of the ion-laser tube be increased. For example, an arithmetic roughness of approximately 20 micrometers renders an output of the ion-laser tube to be reduced down to approximately 60%.

The realization of the ion-laser tube without output reduction due to such sputtering forces the arithmetic roughness, or the maximum height in the inner wall surface of the silicon carbide slender discharge tube 1 to be limited down to 4 micrometers or smaller.

Figure 1:
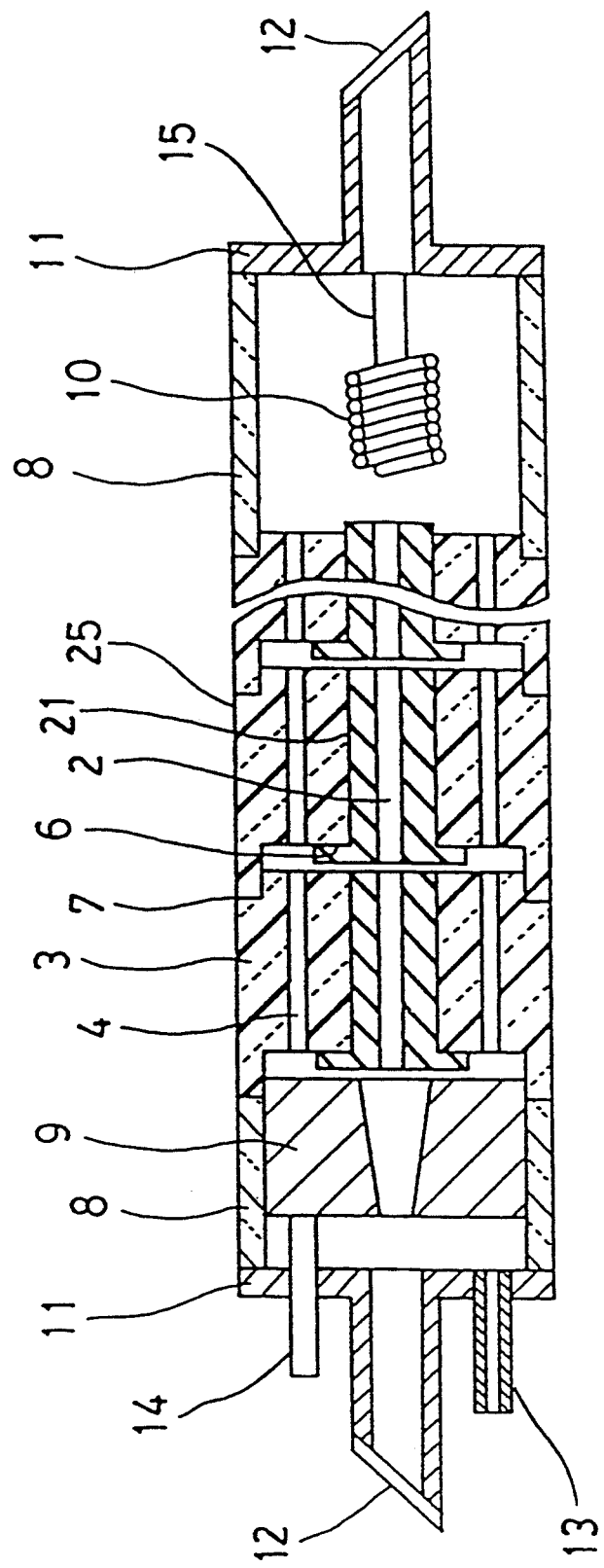
FIG. 1 is a cross sectional elevation view illustrative of the conventional structure of the ion-laser tube involving the silicon carbide discharge tube.
Figure 2:
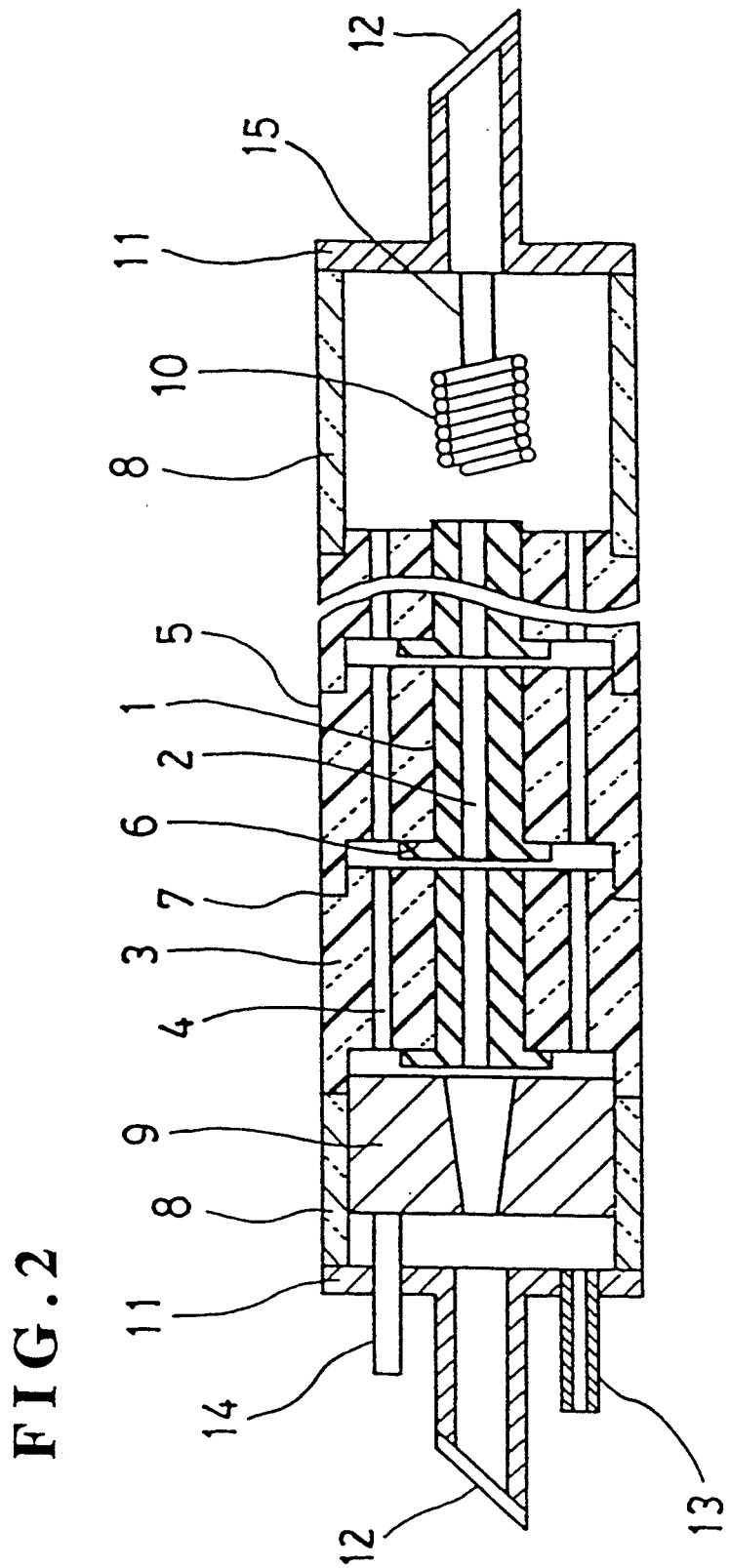
FIG. 2 is a cross sectional elevation view illustrative of a structure of an improved ion-laser tube involving a silicon carbide discharge tube having an improved inner wall being possessive of a small degree of the roughness in a surface thereof.

The structure of the ion-laser tube of one embodiment will subsequently be described with reference to FIG. 2, although the structure is analogous to the prior art, except for a discharge tube. The structure of the ion-laser tube includes a slender discharge tube 1 which serves as a discharge tube. The slender discharge tube 1 is made of silicon carbide which is a resistive material to the sputtering caused by a high energy plasma gas. The silicon carbide slender discharge tube 1 has a length of 25 millimeters and an outside diameter of 10 millimeters. The silicon carbide slender discharge tube 1 is located along a center axis of the ion-laser tube. The silicon carbide slender discharge tube 1 also includes one end with a flange. The silicon carbide slender discharge tube 1 has an inner wall which defines a through hole 2 having a diameter of 2.5 millimeters. The through hole 2 serves as a discharge guiding way in which the discharge is accomplished. The improvement in the ion-laser tube manifests in a small degree of the arithmetic roughness in the surface of the inner wall of the silicon carbide slender discharge tube 1. For example, the arithmetic roughness and thus the maximum height in the irregularity in the surface of the inner wall is so suppressed as to be within approximately 4 micrometers thereby being free from undesirable affections such as a substantial output reduction due to sputtering caused by high energy ions and electrons supplied by a large discharge current.

The silicon carbide slender discharge tube 1 is enclosed by a tubular enclosure member 3 being made of aluminium nitride which has a high heat conductivity. The aluminium nitride tubular enclosure member 3 has an outside diameter of 35 millimeters and a length of 40 millimeters. The aluminium nitride tubular enclosure member 3 has one end which is formed with a hollow portion having a depth of 8 millimeters and a diameter of 30 millimeters. The aluminium nitride tubular enclosure member 3 has opposite end which is formed with a projective portion having a height of 2 millimeters and a diameter of 29 millimeters. The aluminium nitride tubular enclosure member 3 also includes a through hole having a diameter of 10 millimeters so that the silicon carbide slender discharge tube 1 having the outside diameter is inserted into the though hole of the aluminium nitride tubular enclosure member 3. The aluminium nitride tubular enclosure member 3 includes a plurality of gas return holes 4 having a diameter of 1.8 millimeters, through which the ion-gas which has been served for discharge is transmitted. The plural gas return holes 4 are so located as to in concentricity encompass the silicon carbide slender discharge tube 1.

The silicon carbide slender discharge tube 1 is inserted into the aluminium nitride tubular enclosure member 3 through a frit glass 6, followed by an implementation of a heat treatment of 700° C. in an atmosphere. As a result of those, the silicon carbide slender discharge tube 1 and the aluminium nitride tubular enclosure member 3 are so connected to one another as to support a high heat conductivity possessed by the aluminium nitride tubular enclosure member 3 thereby resulting in a formation of a combined coaxial tubular member 5 comprising the silicon carbide slender discharge tube 1 and the aluminium nitride tubular enclosure member 3.

With respect to the silicon carbide slender discharge tube 1, after a burning process, a polishing process is so accomplished that the arithmetic roughness, or the degree of the irregularity in the inner wall surface of the silicon carbide slender discharge tube 1 is taken into 4 micrometers or smaller. Consequently, such small arithmetic roughness provides no reduction of the output of the ion-laser tube, which is readily understood from FIG. 3. In contrast to the ion-laser tube provided by the invention, the prior art ion-laser tube is engaged with a substantial output reduction due to a relatively large arithmetic roughness in the inner wall surface of the silicon carbide slender discharge tube 1. Typically, in the prior art the arithmetic roughness is in the range from 10 to 20 micrometers. From FIG. 3, it is understood that conventional ion-laser tube has a problem in a substantial output reduction in the range from approximately 85% to 60%. Therefore, the improvement in the irregularity in the inner wall surface of the silicon carbide slender discharge tube 1 is permissive of freeing the ion-laser tube from such disadvantages in the substantial output reduction.

A plurality of such combined coaxial tubular members 5 are connected to one another along the center axis through a frit glass 7 so as to support a high heat conductivity possessed by the aluminium nitride tubular enclosure member 3. The alignment of the combined coaxial tubular members 5 is accomplished by using a jig which is not illustrated. The number of the combined coaxial tubular members 5 is so determined as to obtain a predetermined length typically in the range from 500 to 600 millimeters of the alignment of the combined coaxial tubular members 5 thereby providing a desirable laser output. The alignment of the plural combined coaxial tubular members 5 is terminated in borosilicate glass tubes 8. Namely, the alignment of the combined coaxial tubular members 5 is connected at its opposite ends with two of the borosilicate glass tubes 8.

As described the above, the inner wall of the silicon carbide slender discharge tube 1 is directly exposed to a high energy ionized gas, or a plasma gas of a high temperature. Then, such high energy ionized gas including high energy ions and electrons supplied by a large discharge current, typically 30 A is likely to make sputtering to silicon carbide molecules involved in a surface of the inner wall of the silicon carbide slender discharge tube 1. Silicon carbide molecules which has been subjected to such sputtering are forced to be driven out from the surface of the inner wall of the silicon carbide slender discharge tube 1. After that, the sputtered silicon carbide molecules are likely to be deposited on inner surfaces of the Brewster windows 12. This renders the high output characteristics of the ion-laser tube be substantially depressed.

However, the present invention provides such improvement in the irregularity, or the arithmetic roughness in the surface of the inner wall of the silicon carbide slender discharge tube 1. Such small arithmetic roughness, typically 4 micrometers or smaller, in the inner wall surface of the silicon carbide slender discharge tube 1 is permissive of preventing such deposition of the sputtered silicon carbide molecules on the Brewster windows 12. The ion-laser tube including such improved silicon carbide slender discharge tube 1 provided by the present invention is able to have the output of the ion-laser tube remain at a predetermined and desirable value though a long time, for example 10 hour aging, which is understood from FIG. 3. Thus, the novel ion-laser tube provided by the present invention is free from such disadvantages in the substantial output reduction. Further, the prevention of the deposition of the sputtered silicon carbide molecules on the Brewster windows 12 renders the ion-laser tube free from the drop out phenomenon, and thus the rapid reduction of the laser output. Furthermore, the improvement over the prior art also manifests in yield. Therefore, such novel ion-laser tube provided by the present invention is possessive of a high reliability without output reduction and a longer life time.

Whereas modifications of the present invention will no doubt be apparent to a person of ordinary skilled in the art, it is to be understood that the embodiments shown and described by way of illustration are by no means intended to be considered in a limiting sense. Accordingly, it is to be intended to by the claims to cover all modifications of the invention which fall within the spirit and scope of the invention.

What is claimed is:

1. An ion-laser tube comprising:
    a discharge tube made of silicon carbide and having an inner wall located along a center axis of said ion-laser tube, said inner wall having a surface possessive of an arithmetic roughness of approximately 4 micrometers or smaller;
    a tubular enclosure member located along said center axis for enclosing said discharge tube;
    a first closing member connected to one end of said tubular enclosure member, said first closing member including an anode; and
    a second closing member connected to opposite end of said tubular enclosure member, said second closing member including a cathode.

2. The ion-laser tube as claimed in claim 1, wherein said tubular enclosure member is made of aluminium nitride.

3. An ion-laser tube possessive of a high output characteristic comprising:
    a plurality of combined coaxial tubular members aligned along a center axis of said ion-laser tube, each of said combined coaxial tubular members comprising:
    a discharge tube made of silicon carbide and having an inner wall including a surface possessive of an arithmetic roughness of approximately 4 micrometers or smaller,
    a tubular enclosure member combined with said discharge tube for enclosing said discharge tube,
    a first closing member connected to one end of said tubular enclosure member, said first closing member including an anode; and
    a second closing member connected to opposite end of said tubular enclosure member, said second closing member including a cathod.

4. The ion-laser tube as claimed in claim 3, wherein said tubular enclosure member is made of aluminium nitride.

* * * * *